April 16, 1957  H. C. AXELSEN  2,788,952
FISH TAPE REEL SPREADER
Filed Sept. 9, 1954  2 Sheets-Sheet 2
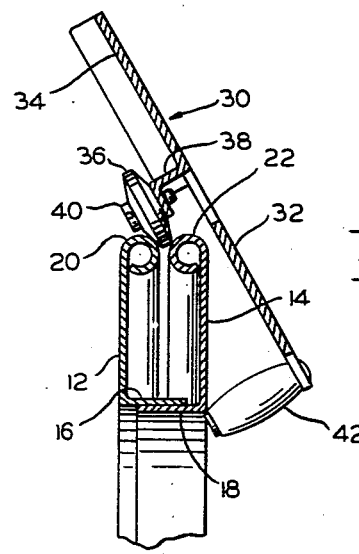
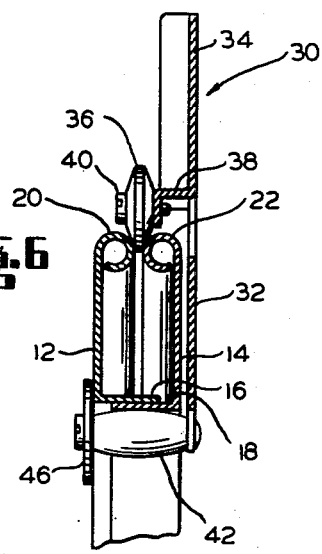
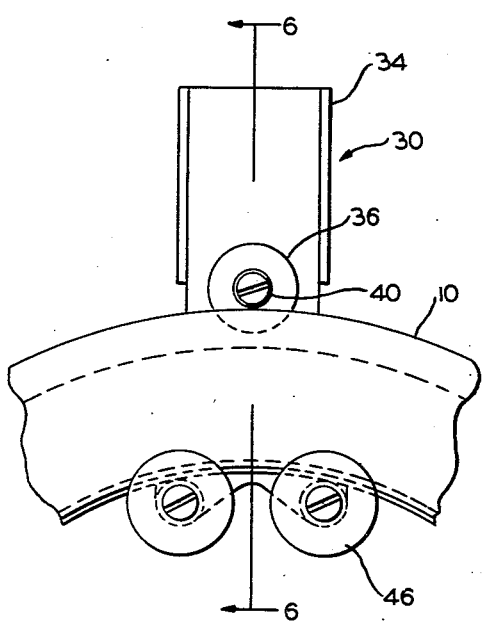
INVENTOR.
Howard C. Axelsen
BY
PARKER & CARTER
ATTORNEYS United States Patent Office 2,788,952
Patented Apr. 16, 1957

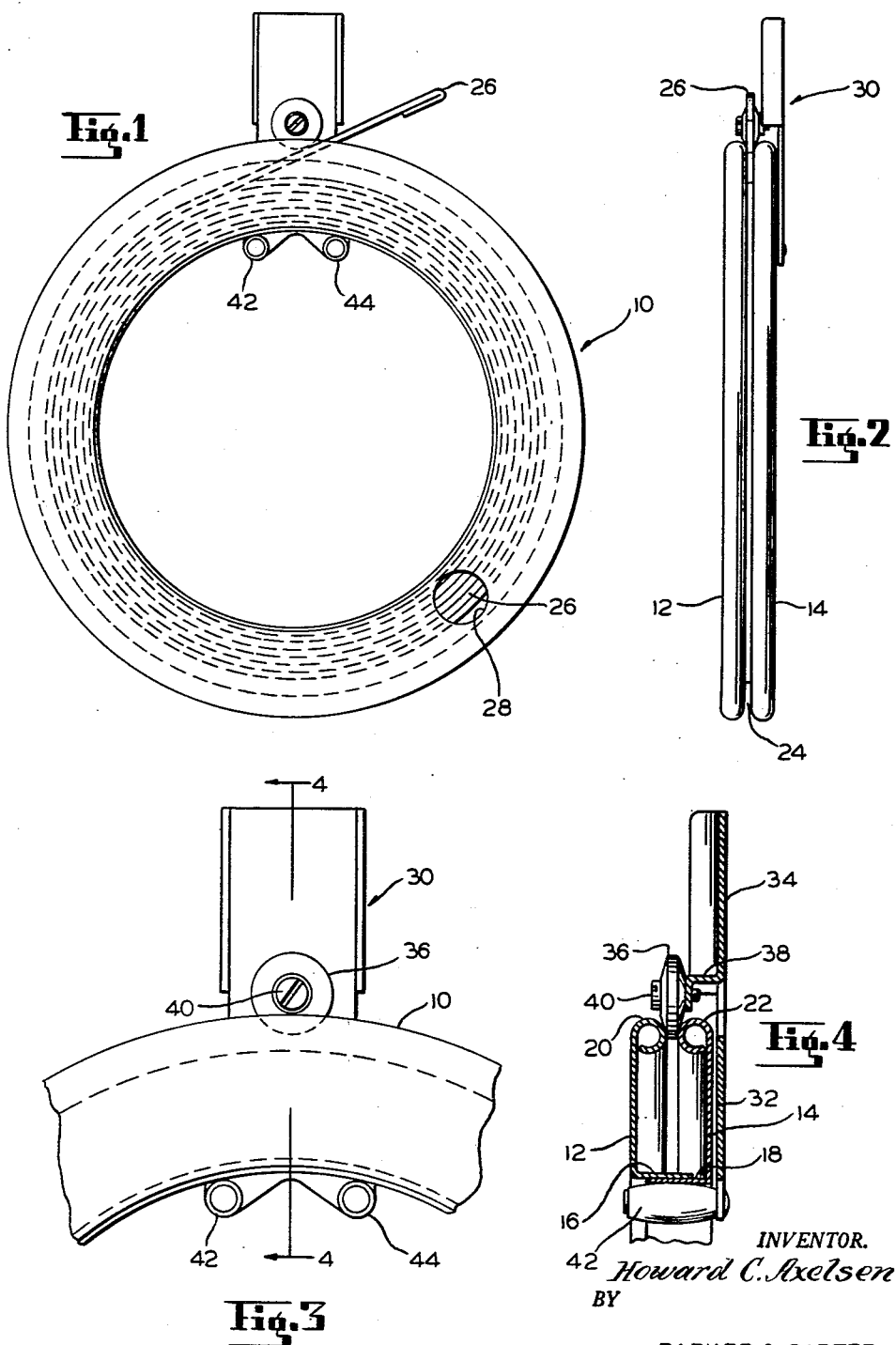

2,788,952
FISH TAPE REEL SPREADER

Howard C. Axelsen, De Kalb, Ill., assignor to Ideal Industries, Inc., Sycamore, Ill., a corporation of Delaware Application September 9, 1954, Serial No. 455,006

5 Claims. (Cl. 254—134.3)

My invention resides in the field of attachments and devices for use with fish tape reels to assist an operator in winding and unwinding the fish tape from the reel.

The invention is more specifically a reeler or reel device adapted to be mounted on the reel so as to spread the reel opening and allow the tape to flex through the opening during unwinding and to force the tape onto the reel through the opening during winding.

A primary object of my invention is a fish tape reeling device adapted to be quickly mounted on or removed from a conventional fish tape reel.

Another object is a reeling unit of the above type which, when positioned on the reel, may slightly spread the opening at one point so that the flexible tape can easily pass through it.

Another object is a fish tape reel winder and unwinder of the above type which is simple in construction, easily manufactured, and very inexpensive.

Another object is a fish tape reel spreader of the above type which has a three-point contact with the reel so that it will not skew or cant during use.

Another object is a modified form of the reel spreader in which the unit is more or less permanently mounted upon the reel.

Other objects will appear from time to time in the ensuing specification and drawings, in which:

Fig. 1 is a side view of a conventional fish tape reel with my reeler unit mounted thereon;

Fig. 2 is an end view of Fig. 1;

Fig. 3 is an enlarged view of the reel winder shown in Fig. 1;

Fig. 4 is a sectional view taken along line 4—4 of Fig. 3;

Fig. 5 is a view similar to Fig. 4, but showing the reel spreader in its unmounted position;

Fig. 6 is a modified form of the reel unit similar to Fig. 4; and

Fig. 7 is a side view of Fig. 6.

In the drawings the fish tape reel is indicated generally at 10 and is composed of a pair of side members 12 and 14 which have turned-under annular-type flanges 16 and 18 on their lower edge. These inner flanges may be welded together or otherwise suitably secured. The outer edges are rolled or turned-in at 20 and 22 and are spaced from each other to define an annular opening 24. The reel is thus in the form of an annular channel closed on its inner surface and open on its outer surface, adapted to receive a fish tape 26 which has one end connected to the reel in any suitable manner and is wound about the reel so as to be coiled in the channel. The sides of the reel may have suitable openings 28 so that the user can easily tell how much tape is on the reel.

The width of the tape is normally slightly greater than the width of the opening 24. Therefore, the tape must be forced both into and out of the reel. This is an advantage because the tape is very resilient, and if it could easily pass through the opening, it would quickly unwind when the user released it. But the tape will not freely pass through the opening 24 and when the reel is laid aside, the relatively flexible sides 12 and 14 refuse to allow the tape to unauthorizedly unwind.

Reels of this nature are very well known and I have not shown my particular reel in detail, however attention is directed to U. S. Patent No. 1,890,945 for a reel of this nature. It should be understood that the details of the reel do not in and of themselves form a part of my invention.

I have shown a reel unit 30 which is composed of a body member 32 with a suitable handle 34 extending from it. The body member carries a roller 36 pivotally mounted by a suitable screw 40 on an inwardly struck bracket 38. A pair of guide rollers 42 and 44 may be mounted on the body member and are spaced from the roller 36 so that they will fit under the inner edge of the reel. It should be noted that the guide rollers are generally equally spaced from the roller 36 and are also spaced from each other. It should also be noted in Fig. 4 that the guide rollers are barrel-shaped so that they will have a high point or surface to engage the reel. The guide rollers additionally extend completely through the reel and project slightly on the other side so that a firm contact will be acquired.

The combination of these three rollers, the two guide rollers and the roller 36, give a three-point contact with the reel. The guide rollers are spaced from the main roller so that when the guide rollers are securely mounted under the lower surface of the reel in Fig. 4, the main roller will be positioned in the opening 24 between the sides 12 and 14. The sides of the spreader roller may be frustoconical, as shown in Fig. 4, so that the roller will have a slight wedging or spreading action in the opening 24 of the reel. The dimensioning is such that the opening in the reel will be spread by the spreader roller to a width slightly greater than the width of the fish tape. Thus the fish tape, due to its inherent flexibility, will move through the opening and will directly engage the spreader roller. The reel unit can be used to both wind and unwind the fish tape.

In Fig. 6 I have shown a modified form of the invention in which suitable washers 46 are mounted on the outer end of the guide rollers after the unit is positioned on the reel. Thus it cannot thereafter be removed. This is in the nature of a semipermanent mounting, whereas the unit in Figs. 1 through 4 can be easily taken off of the reel, if desired.

The use, operation and function of my invention are as follows:

I have shown and described a reel unit or spreader. This device is useful for the following reasons:

Fish tapes are old and well-known. They are used primarily to draw or pull electric wires or cables through conduits. They are also used for rewiring houses or buildings or other types of installations. A tape of this nature is relatively flexible, fairly stiff, and quite strong. When the tape is not in use it has enough flexibility so that it must be held in some sort of reel or container to prevent its unwinding. Reels of this nature are old and well-known. I have shown one type which is, in essence, an annular channel with an outer opening having a width slightly less than the width of the tape. When the tape is wound up on the reel, it cannot escape through the opening because of the binding effect between the tape and the opening.

A reel of this nature is very simply stamped out of sheet metal and quickly welded together, or otherwise suitably secured. It is not a precision item. Therefore, various inaccuracies can arise during its manufacture. One specific trouble that has developed is that the width of the opening through which the tape must pass can vary. If the opening is too wide, the tape will escape and the reel will be completely unusable. Therefore, the tendency is to make the opening narrow. On many occasions the opening is made too narrow. This causes the tape to bind excessively and the operator or user will frequently bend it as he is trying to draw it out or replace it.

These reels are usually painted or otherwise coated to prevent them from rusting; however, after extensive use the tape will have worn away the paint on the rolled edges of the reel that define the opening. This worn surface is bare metal and will rust. This additionally tends to bind the tape as it is withdrawn or replaced in the reel.

I have devised this very simple, inexpensive and efficient reeler unit which can be quickly attached or removed from a conventional fish tape reel and which will insure at all times that the fish tape can be easily reeled. The dimensioning between the spreader rollers and the guide rollers is such that the wedge-shaped spreader roller is forced slightly into the opening and flexes the sides outwardly. The opening through which the tape must pass is therefore slightly larger than the width of the tape and the tape will flex up into the position shown in Fig. 1. The tape bears against the roller 36, both during winding and unwinding. In Fig. 1 the user merely grabs the handle with one hand and rotates the reel clockwise to unwind the tape from the reel. To rewind it, the reel is wound counterclockwise. In both cases the roller 36 bears against the fish tape. At the same time, the spreader roller may flex the sides of the reel so that the tape can easily pass through the opening.

The rollers give a three-point contact with the reel and the spreader will not have a tendency to cant or skew and will not bind in the opening. The reel unit can be easily mounted and taken off of the reel. In Fig. 5 I have shown the position of the reel as it is mounted. The spreader roller is first slipped into the groove and the guide rollers are then forced under the reel by rotating the entire unit clockwise. To remove the reel spreader, this procedure need only be reversed.

While I have shown and described the preferred form of my invention, it should be understood that many modifications, changes, alterations and substitutions can be made. I therefore wish that my invention be unrestricted except as by the appended claims.

I claim:

1. In a reeling device adapted to be removably fitted on an annular fish tape reel, the reel having a continuous outwardly opening slot for the entrance and exit of a relatively resilient fish tape, the slot being defined by opposed rolled edges of the reel's relatively flexible sides, the lateral dimension of the slot at all peripheral points being normally slightly less than the lateral dimension of the fish tape, so that during reeling and unreeling of the tape, a slight interference fit will be present to prevent the tape, due to its relative resilience, from unauthorizedly unwinding: the improvement including a rigid body frame adapted to be grasped by the operator while straddling a limited minor circumferential section of the reel and having portions lying radially inside and outside of the reel to hold the frame in place, the frame being constructed so that the reeling device can be manually moved peripherally around the reel when the tape is being reeled or unreeled, and a tape engaging member fixed on the body frame and constructed to engage the tape and flex it through the continuous outwardly opening slot in the reel, the tape engaging member being spaced a predetermined fixed distance from the said portion of the frame inside of the reel, the spacing being fixed and constant in all positions of operation of the body frame on the reel, whether reeling or unreeling, the spacing of the tape engaging member from the said portion of the frame inside of the reel being related to the radial dimension of the reel such that peripheral movement of the frame by the operator, relative to the reel, during reeling of the tape will cause the tape engaging member to engage the tape and project a sufficient distance toward the interior of the reel so that the continuous outwardly opening slot will be spread slightly and the tape will pass through and be wound on the reel.

2. The structure of claim 1 further characterized in that the said portion of the frame inside of the reel includes at least two guide rollers mounted for rotation on the frame and constructed to be rolled against the inner surface of the reel during either a reeling or unreeling operation, the frame being constructed to straddle only one side of the reel so that the frame may be quickly snapped onto the reel and quickly removed.

3. The structure of claim 1 further characterized in that the tape engaging member includes a roller mounted for rotation in a fixed position on the frame and constructed to project into the slot and to spread the slot slightly at the same time that the roller engages the flexible fish tape so that the lips of the reel will be spread sufficiently to locally eliminate the interference fit.

4. For use with an annular resilient fish tape reel having a channel with a continuous outward opening defined by opposed rolled edges of the reel's relatively flexible sides, the fish tape being slightly wider than the opening so that during reeling and unreeling, a slight interference fit will prevent the fish tape from coming out of the reel, the improvement comprising a reel spreader having a circumferentially limited body member with a rigid handle extending therefrom, a spreader roller mounted in a fixed position on the body member, and at least one guide roller mounted on the body member, the rollers being spaced a predetermined fixed distance from each other in all positions of operation so that when the guide roller is positioned against the inner surface of the reel, the spreader roller, at all times and in all positions of operation, will spread the rolled edges a distance slightly greater than the width of the tape during either reeling or unreeling to locally eliminate the interference fit.

5. The structure of claim 4 further characterized by and including two guide rollers generally equally spaced a predetermined distance from the spreader roller and spaced from each other, both guide rollers being adapted to be positioned against the inside surface of the reel and disposed generally the same distance on each side of a radial line running through the spreader roller, the reel spreader being constructed to span only one side of the reel.

References Cited in the file of this patent
UNITED STATES PATENTS

| | | |
|---|---|---|
| 1,127,214 | Erickson | Feb. 2, 1915 |
| 1,176,615 | Stempel | Mar. 21, 1916 |
| 1,815,433 | Dunagan | July 21, 1931 |
| 2,300,087 | Anello | Oct. 27, 1942 |
| 2,689,709 | Waldschmidt | Sept. 21, 1954 |

FOREIGN PATENTS

| | | |
|---|---|---|
| 283,893 | Switzerland | Nov. 1, 1952 |